United States Patent [19]

Yautz, Jr.

[11] Patent Number: 4,596,326
[45] Date of Patent: Jun. 24, 1986

[54] FEEDER FOR CYLINDRICAL ROLLS

[75] Inventor: Michael Yautz, Jr., Easton, Pa.

[73] Assignee: SI Handling Systems, Inc., Easton, Pa.

[21] Appl. No.: 691,315

[22] Filed: Jan. 14, 1985

[51] Int. Cl.⁴ .............................................. B65G 37/00
[52] U.S. Cl. .............................. 198/463.6; 198/468.6
[58] Field of Search ............... 198/491, 492, 459, 489, 198/469, 470, 463.6, 463.4, 468.6; 414/748; 193/40, 32

[56] References Cited

U.S. PATENT DOCUMENTS

| 2,947,402 | 8/1960 | Groll | 193/40 |
| 3,854,726 | 6/1971 | Hartzell | 198/492 |
| 4,434,888 | 3/1984 | Divoux et al. | 198/489 X |

FOREIGN PATENT DOCUMENTS 0779220 11/1980 U.S.S.R. .............................. 414/748

Primary Examiner—Joseph E. Valenza
Assistant Examiner—D. Glenn Dayoan
Attorney, Agent, or Firm—Seidel, Gonda, Goldhammer & Abbott

[57] ABSTRACT

An inclined ramp is provided with a bed mounted for pivotable movement about an axis transverse to the ramp. The bed has upstream and downstream portions forming between them an obtuse angle. The upstream portion is provided with a cavity through which a pivotable, shock mounted stop arm extends for easing roll contact with the bed. Motor means is provided for pivoting the stop arm and the bed so that rolls may be fed one at a time.

11 Claims, 4 Drawing Figures 4,596,326

FEEDER FOR CYLINDRICAL ROLLS

BACKGROUND

Large cylindrical rolls of paper or the like are delivered by rail car to a place of use. From the rail car the rolls are moved onto an inclined ramp. When such rolls are made of paper for use in printing newspapers or other publications, the rolls have a diameter up to 125 cm, and a weight of between 250 and 1,000 Kg. While a plurality of rolls are provided on an inclined ramp, it is necessary to feed the rolls one at a time to a conveyor which conveys the rolls to a particular portion of the printing apparatus.

The problem solved is how to feed large heavy rolls one at a time from a plurality of such rolls supported by an inclined ramp without damaging the rolls and without requiring extra floor space along side the ramp.

SUMMARY OF THE INVENTION

The present invention is directed to a feeder for feeding large cylindrical rolls one at a time. An inclined ramp is provided with a recess. A frame is mounted in the recess. A bed is mounted on the frame for pivotable movement about an axis transverse to the ramp. The bed has an upstream portion and a downstream portion which are angularly disposed to form an obtuse angle therebetween. The downstream portion has a stop arm pivotable about a horizontal axis transverse to the ramp from a retracted position on the bed to an upright operative position for stopping contact with a roll on the bed. Upon such contact the roll pivots the stop arm to its retracted position. A motor means is provided for thereafter pivoting the bed from a receiving position to a discharge position.

It is an object of the present invention to provide a feeder for feeding rolls one at a time from a plurality of such rolls supported by an inclined ramp without damaging the rolls especially when the first roll is introduced to the system. The first roll does not have the "buffer" effect of rolls already in place at the feeder, and the first roll can hit the stop with considerable force.

It is an object of the present invention to provide a feeder for feeding large cylindrical rolls of paper one at a time by use of apparatus which is simple, reliable, and easy to maintain, and especially gentle to the first roll.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
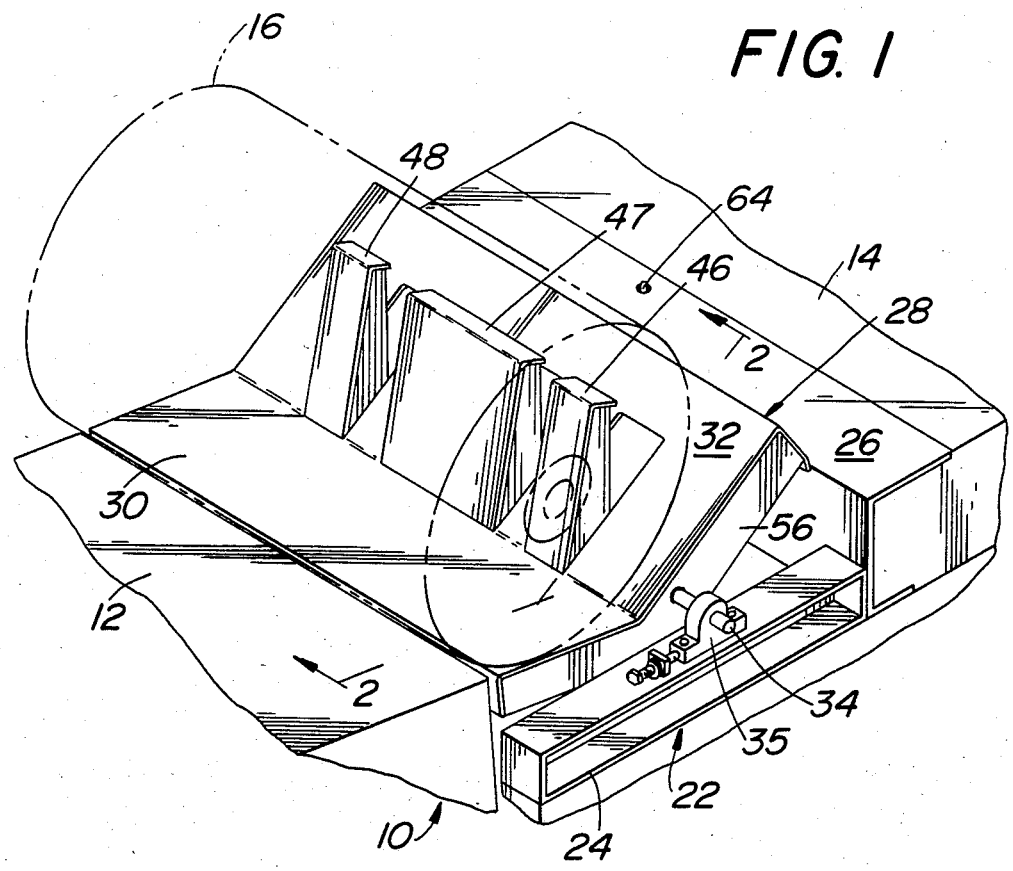
FIG. 1 is a partial perspective view of a ramp incorporating the feeder of the present invention with a roll shown in phantom.

Referring to the drawing in detail, wherein like numerals indicate like elements, there is shown in FIG. 1 a ramp 10 having an upstream portion 12 and downstream portion 14. The ramp 10 is inclined at a slope of about 4.10 cm/meter to 5.12 cm/meter. The upstream portion 12 contains a plurality of large cylindrical rolls of paper or the like. The leading roll is designated 16 and the next adjacent roll is designated 18. The remaining rolls behind roll 18 are not shown since illustration of the same is not deemed necessary in order to understand the present invention.

The ramp 12 is provided with a recess 20. The recess 20 contains a preassembled feeder 22. The feeder 22 includes a metal frame which is designated generally as 24 and which supports the components of the feeder 22. The downstream end of the frame 24 includes a channel 26 having a upper surface which is flush with the downstream portion 14 of the ramp 10.

Figure 4:
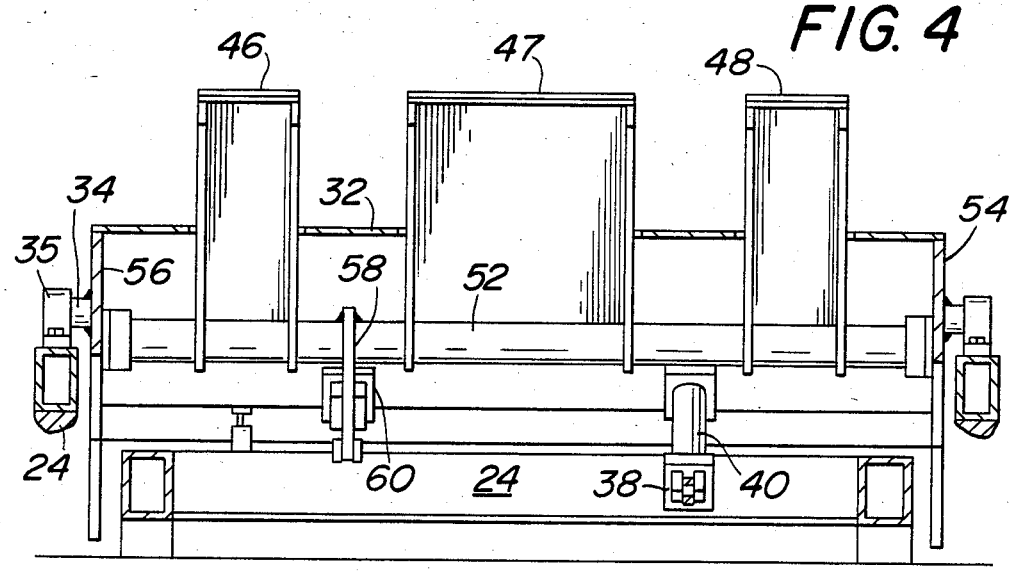
FIG. 4 is a sectional view taken along the line 4—4 in FIG. 2.

The feeder 22 includes a bed 28. Bed 28 has an upstream portion 30 and a downstream portion 32 rigidly connected together and angularly disposed so as to form an obtuse angle therebetween. As illustrated, the obtuse angle is 135°. The bed 28 has an axle 34 supported by a pillow block 35 on the frame 24 for pivotable movement about a horizontal axis transverse to the ramp 10. See FIGS. 1 and 4. The frame 24 includes a transverse strut 36 below the elevation of the bed 28. A clevis 38 is supported by the strut 36. Clevis 38 is pivotably connected to one end of a cylinder 40. A piston rod 41 extends from the other end of cylinder 40. The free end of piston rod 41 is pivotably connected to a strut 42. The strut 42 is supported at its ends by the side walls of the upstream portion 30 on the bed 28.

Figure 2:
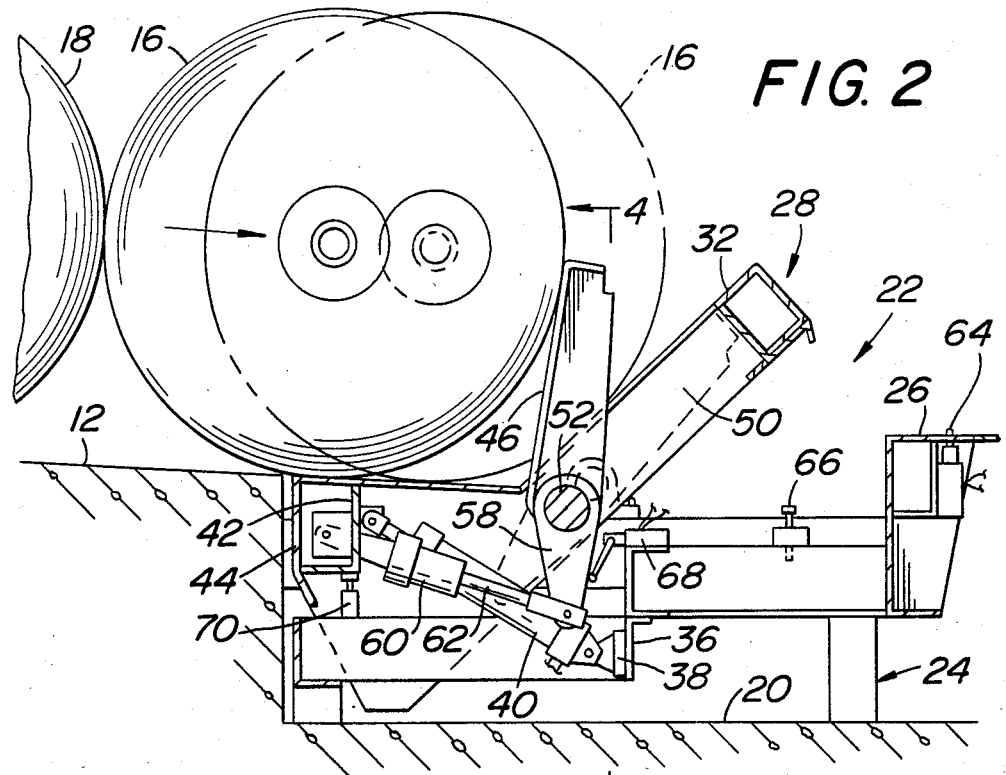
FIG. 2 is a sectional view taken along the line 2—2 in FIG. 1 with the bed in the receiving position and shown on an enlarged scale.
Figure 3:
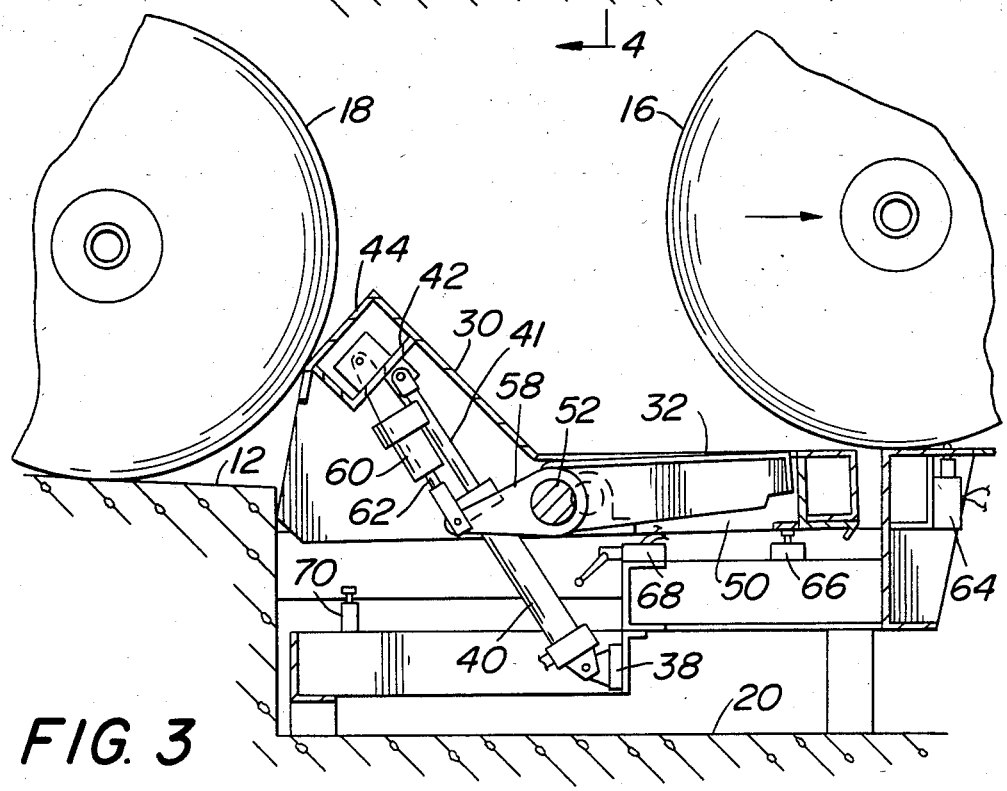
FIG. 3 is a view similar to FIG. 2 but showing the bed in a discharge position.

When the cylinder 40 is in the position as shown in FIG. 2, the bed 28 is in its receiving position. When the cylinder 40 is stroked to the position as shown in FIG. 3, the bed 28 is in its discharge position. Bed 28 pivots about axle 34 through an acute angle of about 45°. When the bed 28 is in its discharge position, a bumper 44 on the leading end of upstream portion 30 contacts the roll 18 to maintain the same stationary while roll 16 is being discharged. Bumper 44 is reinforced by strut 42.

The downstream portion 32 of the bed 28 has one or more stop arms supported thereon. As illustrated, there is provided a plurality of stop arms designated 46, 47 and 48. The uppermost surface of the downstream portion 32 is provided with slots so that the stop arms may enter the cavity 50 on bed 28. The stop arms 46–48 are movable to an operative roll contacting position as shown in FIG. 2 from the retracted position as shown in FIG. 3. When the arms 46–48 are in their operative position the included angle with portion 30 is about 100° as shown in FIG. 2.

Each of the arms 46–48 is fixedly secured to a shaft 52. Shaft 52 extends transversely of the ramp 10 and is supported at its ends by the side walls 54, 56 on the frame 28. See FIG. 4. An arm 58 has one end fixedly secured to the shaft 52 in a position so as to simulate an extension of the arms 46–48. See FIGS. 2 and 3. The other end of arm 58 is pivotably connected to one end of a piston rod 62. The other end of piston rod 62 extends into a shock absorber 60. The shock absorber 60 is pivotably supported by the strut 42. Shock absorber 60 absorbs the shock imparted to the arms 46–48 by contact with the roll 16 so as to handle the rolls, especially the first roll, gently to avoid damaging the rolls.

The frame 24 includes a limit stop 66 for contact with the downstream portion 32 of the bed 28 when the latter is in its discharge position as shown in FIG. 3. The frame 24 also includes a similar, limit switch 70 for contact with the upstream portion 30 when the latter is in its receiving position as shown in FIG. 2. The frame 28 includes a roll discharge limit switch 64 on channel 26 and a shock arm return limit switch 68 which is adapted to cooperate with arm 58.

The feeder of the present invention operates as follows. Fluid is continuously applied to the shock absorber 60 to move the arms 46–48 to the contact position as shown in FIGS. 1 and 2. When roll 16 contacts the arms 46–48, the roll 16 causes the arms 46–48 to pivot to the retracted position as shown in FIG. 3. As the arms 46–48 pivot, arm 58 loses contact with switch 68. As a result thereof, switch 68 communicates a signal to the controller not shown to indicate that the bed 28 may now move to its discharge position. The controller is interfaced with a conveyor means downstream from the feeder. When the conveyor means is ready to receive a roll, a supply and exhaust valve is moved by the controller to a position to feed fluid to the cylinder 40.

When fluid is fed to one end of the cylinder 40, it pivots the bed 28 from the receiving position shown in FIGS. 1 and 2 to the discharge position as shown in FIG. 3. Bumper 44 holds back the roll 18 while roll 16 discharges. The discharging roll 16 trips the switch 64. Switch 64 signals the controller to reverse the supply of fluid to the other end of cylinder 40 to cause the bed 28 to be moved from the position shown in FIG. 3 to the position shown in FIG. 2.

The arms 46–48, are continuously biased by shock absorber 60 toward the contact position as shown in FIG. 2. As soon as roll 16 looses contact with arms 46–48, the arms move to their operative position to absorb the shock of the roll 18 as it enters onto the bed 28. The process is then repeated. The conveyor downstream from the feeder 10 may be an elevator, an endless conveyor, or may be in the form of wheeled vehicles guided along a predetermined path. The simplicity of the feeder 22 is exemplified by the fact that only two limit switches are required and that the stop arms 46–48 are continuously biased to their roll contact position.

The present invention may be embodied in other specific forms without departing from the spirit or essential attributes thereof and, accordingly, reference should be made to the appended claims, rather than to the foregoing specification, as indicating the scope of the invention.

I claim:

1. A feeder for feeding cylnidrical rolls one at a time comprisinig an inclined ramp having a recess, a frame mounted in said recess, a bed mouted on said frame for pivotable movement about an axis transverse to said ramp, said bed having an upstream portion and a downstream portion angularly disposed to form an obtuse angle therebetween, said downstream portion having mounted thereon a stop arm pivotable about an axis parallel to said first mentioned axis and means for moving said stop arm from a retracted position on said bed to an upright operative position for engaging a roll and easing it into contact with said downstream portion of said bed, and motor means for pivoting said bed from a receiving position to a discharge position after said roll is in contact with said downstream position.

2. A feeder in accordance with claim 1 wherein said upstream portion of said bed is aligned with the surface of said ramp in the receiving position of the bed, and said downstream portion being aligned with the downstream surface of said ramp when the bed is in its discharge position.

3. A feeder in accordance with claim 1 wherein the downstream portion of said bed has a cavity for receiving said stop arm in the retracted position thereof.

4. A feeder in accordance with claim 3 including means for continuously biasing said stop arm to its operative position.

5. A feeder in accordance with claim 4 wherein said last-mentioned means is a shock absorber connected to said stop arm.

6. A feeder in accordance with claim 1 wherein said stop arm includes a plurality of parallel arms connected to a common shaft, the downstream portion of said bed having slots through which the stop arms move when the stop arms pivot to their retracted positions.

7. A feeder in accordance with claim 1 wherein said upstream portion of said bed has a reaction surface thereon for contact with the leading roll of a plurality of rolls along said ramp for holding back such rolls while a roll is being discharged by said bed.

8. A feeder in accordance with claim 1 wherein said frame supports a roll discharge limit switch and a limit switch associated with said stop arm.

9. A feeder in accordance with claim 8 wherein said bed has mounted thereon a plurality of stop arms with each stop arm being connected to a common shaft.

10. A feeder in accordance with claim 9 wherein each of said stop arms is continuously biased to its operative position.

11. A feeder in accordance with claim 1 wherein said means for moving the stop arm applies a continuous bias on the stop arm and absorbs shock imparted to the stop arm as the stop arm is moved to its retracted position due to contact with a roll.

* * * * *